(12) United States Patent  
Saund (10) Patent No.: US 8,831,339 B2  
(45) Date of Patent: Sep. 9, 2014

(54) WEIGHTED FEATURE VOTING FOR CLASSIFICATION USING A GRAPH LATTICE

(75) Inventor: Eric Saund, San Carlos, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 233 days.

(21) Appl. No.: 13/527,032

(22) Filed: Jun. 19, 2012

(65) Prior Publication Data

US 2013/0336580 A1   Dec. 19, 2013

(51) Int. Cl.
*G06K 9/62* (2006.01)
*G06K 9/68* (2006.01)

(52) U.S. Cl.
USPC .......................................... 382/159; 382/218

(58) Field of Classification Search
None
See application file for complete search history.

(56) References Cited

U.S. PATENT DOCUMENTS

| | | | |
|---|---|---|---|
| 6,061,652 A | 5/2000 | Tsuboka et al. | |
| 6,072,891 A | 6/2000 | Hamid et al. | |
| 6,128,606 A | 10/2000 | Bengio et al. | |
| 6,556,983 B1 | 4/2003 | Altschuler et al. | |
| 7,099,505 B2 * | 8/2006 | Li et al. .......................... | 382/159 |
| 7,984,012 B2 | 7/2011 | Coury et al. | |
| 8,073,808 B2 | 12/2011 | Rose | |
| 8,233,722 B2 | 7/2012 | Kletter et al. | |
| 2006/0182317 A1 * | 8/2006 | Neumann et al. ............. | 382/124 |
| 2009/0208112 A1 | 8/2009 | Hamamura et al. | |
| 2012/0047180 A1 * | 2/2012 | Kirshenbaum ............... | 707/797 |
| 2012/0069024 A1 | 3/2012 | Saund | |
| 2012/0070091 A1 | 3/2012 | Saund | |

OTHER PUBLICATIONS

Messmer, B.T., et al. "A new algorithm for error-tolerant subgraph isomorphosm detection," IEEE Transactions on Pattern Analysis and Machine Intelligence, vol. 20, No. 5, pp. 493-504, 1998.
Shervashidz, N., et al., "Efficient graphlet kernels for large graph comparison," in 12th International Conference on Artificial Intelligence and Statistics (AISTATS). Society for Artificial Intelligence and Statistics, 2009, pp. 488-495.
Sidere, N., et al., "Vector representation of graphs: Application to the classification of symbols and letters," in Proc. 10th International Conference on Document Analysis and Recognition (ICDAR 2009). IEEE Computer Society, 2009, pp. 681-685.

* cited by examiner

*Primary Examiner* — Daniel Mariam
(74) *Attorney, Agent, or Firm* — Fay Sharpe LLP (57) ABSTRACT

A system and method classify a test image. At least one processor receives a data graph computed from the test image. Further, a graph lattice is received. The graph lattice includes a plurality of nodes, each including a subgraph, a weight and at least one mapping of the subgraph to data graphs of a plurality of training images. The training images correspond to a plurality of classes. The data graph of the test image is mapped by the subgraphs of the nodes. Mappings between the graph lattice and the data graphs of the training images are compared with mappings between the graph lattice and the data graph of the test image to determine weighted votes of similarity between the data graphs of the training images and the data graph of the test image. The class of the test image is determined from the weighted votes.

20 Claims, 12 Drawing Sheets

WEIGHTED FEATURE VOTING FOR CLASSIFICATION USING A GRAPH LATTICE

BACKGROUND

The present exemplary embodiments relate generally to computer vision. They find particular application in conjunction with image classification and will be described with particular reference thereto. However, it is to be appreciated that the present exemplary embodiments are also amenable to other like applications.

Bag-of-words approaches for image classification are common place. Under such approaches, objects and scenes are modeled as large vectors of feature measurements. Typically, the features are purely appearance-based measuring, for example, local shape and texture properties. However, these features may not be very descriptive and/or discriminative. Hence, a recent trend is to use spatial relationships as features.

One approach for encoding spatial relationships is through graphs. Objects and scenes are modeled as parts (i.e., nodes), such as junctions, and relations (i.e., links) between the parts. Subgraph matching is then employed to find part instances in graph representations of image data.

Subgraph matching poses certain difficulties. Without the use of attributed graphs, subgraph matching is exponentially expensive. An attributed graph is a graph with nodes containing properties that constrain possible matches. However, noise and variability cause observed subgraphs to deviate from ideal models. This demands the use of inexact graph matching techniques, which increase matching costs and largely remove the advantages of attributed graph matching.

In view of the foregoing, it would be advantageous to have methods and/or systems that perform attributed graph matching for large collections of related subgraphs for the purpose of classifying input data in graphical form. The disclosure hereafter contemplates such methods and/or systems.

INCORPORATION BY REFERENCE

U.S. patent application Ser. No. 12/883,503 (U.S. Patent Application Publication No. 2012/0070091) for GRAPH LATTICE METHOD FOR IMAGE CLUSTERING, CLASSIFICATION, AND REPEATED STRUCTURE FINDING, by Eric Saund, filed Sep. 16, 2010, U.S. patent application Ser. No. 12/883,464 (U.S. Patent Publication No. 2012/0069024) for METHOD FOR GENERATING A GRAPH LATTICE FROM A CORPUS OF ONE OR MORE DATA GRAPHS, by Eric Saund, filed on Sep. 16, 2010, and U.S. patent application Ser. No. 13/527,071 for SELECTIVE LEARNING FOR GROWING A GRAPH LATTICE, by Eric Saund, filed on even date herewith, are each hereby incorporated herein by reference in entirety.

BRIEF DESCRIPTION

According to one aspect of the present application, a system for classifying a test image is provided. The system includes at least one processor programmed to receive a data graph computed from the test image. Further, a graph lattice is received. The graph lattice includes a plurality of nodes. Each of the plurality of nodes includes a subgraph, a weight and at least one mapping of the subgraph to data graphs of a plurality of training images. The plurality of training images correspond to a plurality of classes, which may include the class of the test image. The data graph of the test image is mapped by the subgraphs of the plurality of nodes. Mappings between the graph lattice and the data graphs of the training images are compared with mappings between the graph lattice and the data graph of the test image to determine, for each of the training images, a weighted vote of similarity between the data graph of the training image and the data graph of the test image. The weighted vote is based on the weights of the plurality of nodes. The class of the test image is determined from the weighted votes of the training images. The class of the test image is the class of the training image with the highest weighted vote above with the highest weighted vote above a threshold number of votes. If the highest weighted vote fails to exceed the threshold, the class of the test image remains unknown.

According to another aspect of the present application, a method for classifying a test image is provided. The method, performed by at least one processor, includes receiving a data graph computed from the test image. Further, a graph lattice is received. The graph lattice includes a plurality of nodes. Each of the plurality of nodes includes a subgraph, a weight and at least one mapping of the subgraph to data graphs of a plurality of training images. The plurality of training images correspond to a plurality of classes, which may include the class of the test image. The data graph of the test image is mapped by the subgraphs of the plurality of nodes. Mappings between the graph lattice and the data graphs of the training images are compared with mappings between the graph lattice and the data graph of the test image to determine, for each of the training images, a weighted vote of similarity between the data graph of the training image and the data graph of the test image. The weighted vote is based on the weights of the plurality of nodes. The class of the test image is determined from the weighted votes of the training images. The class of the test image is the class of the training image with the highest weighted vote above a threshold number of votes. If the highest weighted vote fails to exceed the threshold, the class of the test image remains unknown.

According to another aspect of the present disclosure, a system for classifying a test image is provided. The system includes at least one processor programmed to receive a data graph computed from the test image. Further, a graph lattice is received. The graph lattice includes a plurality of nodes. Each of the plurality of nodes includes a subgraph, a weight and at least one mapping of the subgraph to data graphs of a plurality of training images. The plurality of training images correspond to a plurality of classes, which may include the class of the test image. The subgraphs of the plurality of nodes are mapped to the data graph of the test image. For each mapping between a node of the graph lattice and the data graph of the test image, the mapping of the test image is compared with each mapping between the node of the graph lattice and the data graphs of the training images. Based on the comparisons and for each of the training images, a weighted vote of similarity between the data graph of the training image and the data graph of the training image is determined. The weighted vote is based on the weights of the plurality of nodes. The class of the test image is determined from the weighted votes of the training images. The class of the test image is the class of the training image with the highest weighted vote above a threshold number of votes. If the highest weighted vote fails to exceed the threshold value, the class of the test image remains unknown.

DETAILED DESCRIPTION

Large families of complex features, in the form of subgraphs, can be built out of simpler subgraphs through construction of a graph lattice. A graph lattice is a hierarchy of related subgraphs linked in a lattice. By supporting large numbers of subgraphs, image structure can be captured. Further, exact graph matching can be performed notwithstanding image noise and variability. Hence, a graph lattice advantageously facilitates efficient image classification.

1.0 OVERVIEW OF A GRAPH LATTICE

The basic framework, called "graph lattice", is a lattice of nodes, where each node corresponds to a subgraph representing image primitives and relations. The graph lattice nodes are related to each other in a lattice by adding primitives upward and removing primitives downward. For example, assuming the lattice extends from subgraph size 1 to size N, where primitives define size 1, all the subgraphs of size i>1 are comprised of a subgraph of size i−1 plus a primitive.

The framework is illustrated in the domain of rectilinear line art. Rectilinear line art can be easily represented as graphs. Rule lines in the domain of rectilinear line art intersect in well-defined ways forming junctions and free-end terminators. These junctions are well suited for use as nodes of a graph, and rule line segments linking junctions are well suited for use as links of the graph. Further, rectilinear line art is common in forms. Classification of forms is a practical problem that can be solved using a graph lattice.

Figure 1:
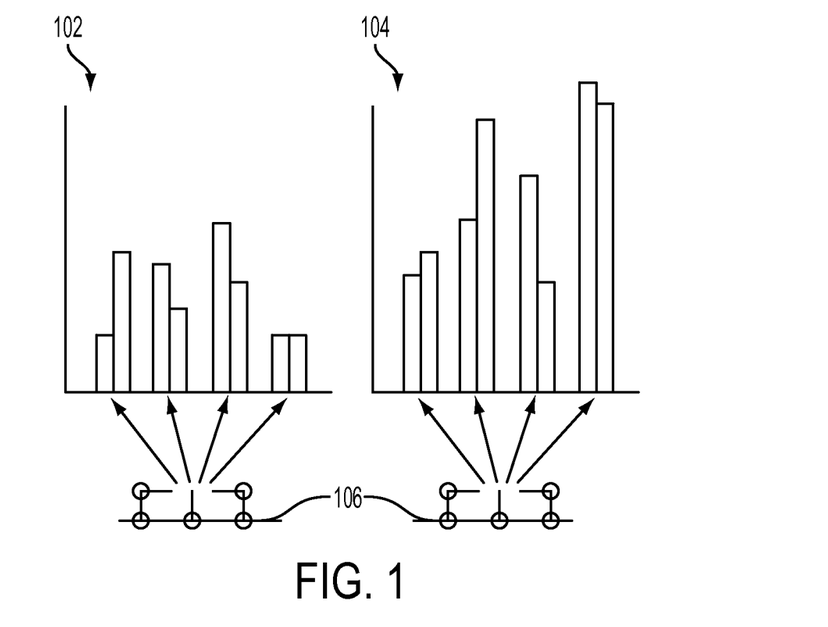
FIG. 1 illustrates examples of rectilinear line art and some of the repeating structure found within these examples.

FIG. 1 shows examples of rectilinear line art and some of the repeating substructure found within these examples. As can be seen, a first image 102 and a second image 104 each include a bar chart. Further, within these images 102, 104, there is repeating substructure, such as substructure 106. Substructure can repeat within a single image and/or across multiple images, and a graph lattice enables the discovery and use of substructure.

Figure 2:
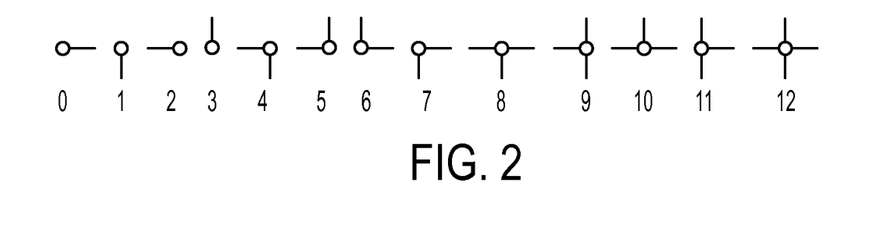
FIG. 2 illustrates that there are thirteen types of junctions (i.e., primitives) in the domain of rectilinear line art.
Figure 3:
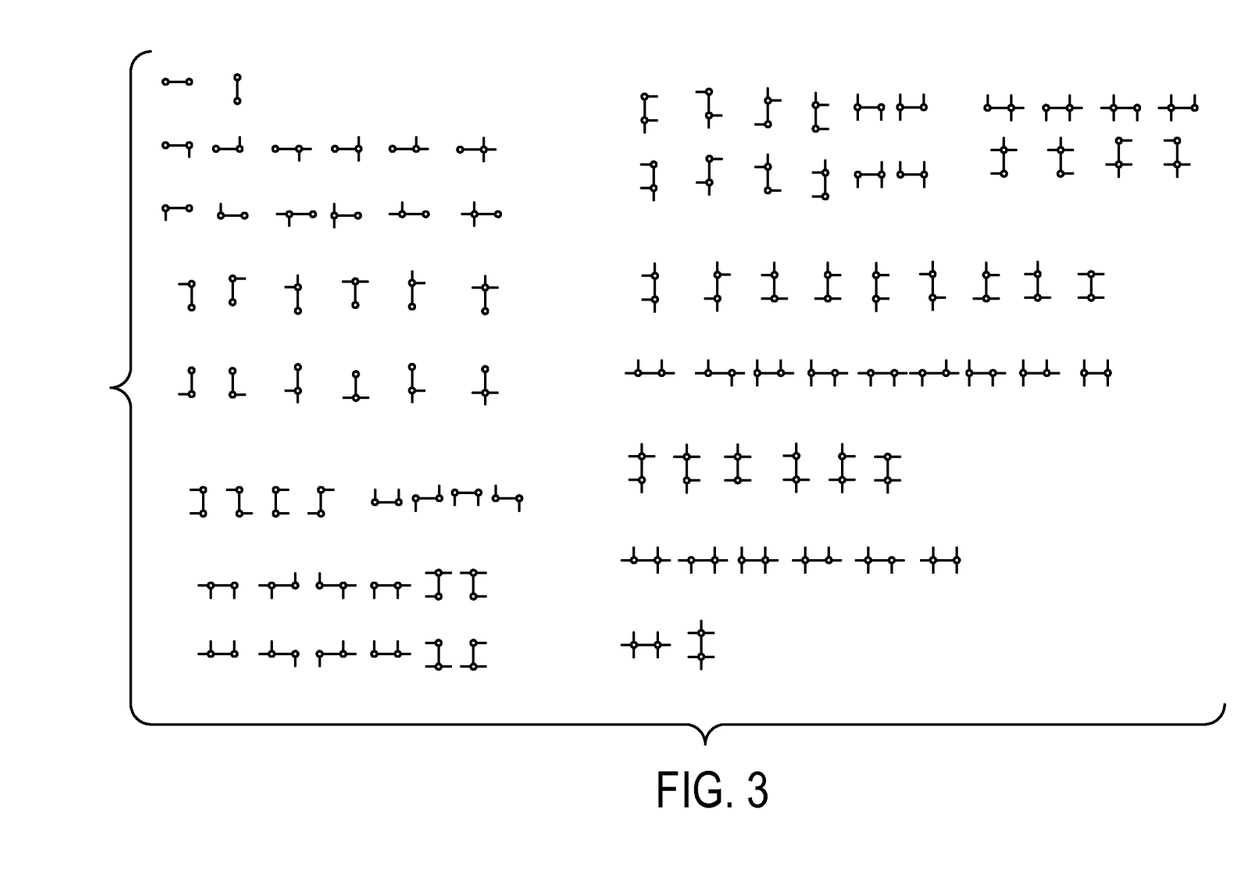
FIG. 3 illustrates that there are 98 possible pairings of primitives.

FIG. 2 defines thirteen types of junctions in the domain of rectilinear line art. These are the primitives, or first level subgraphs, of a graph lattice. The thirteen primitive junction types can be grouped according to their compatible link directions in much the same way atoms combine to form molecules. FIG. 3 shows that there are ninety-eight (98) possible pairings of these primitives. In other words, there are ninety-eight (98) subgraphs of size 2.

Figure 4:
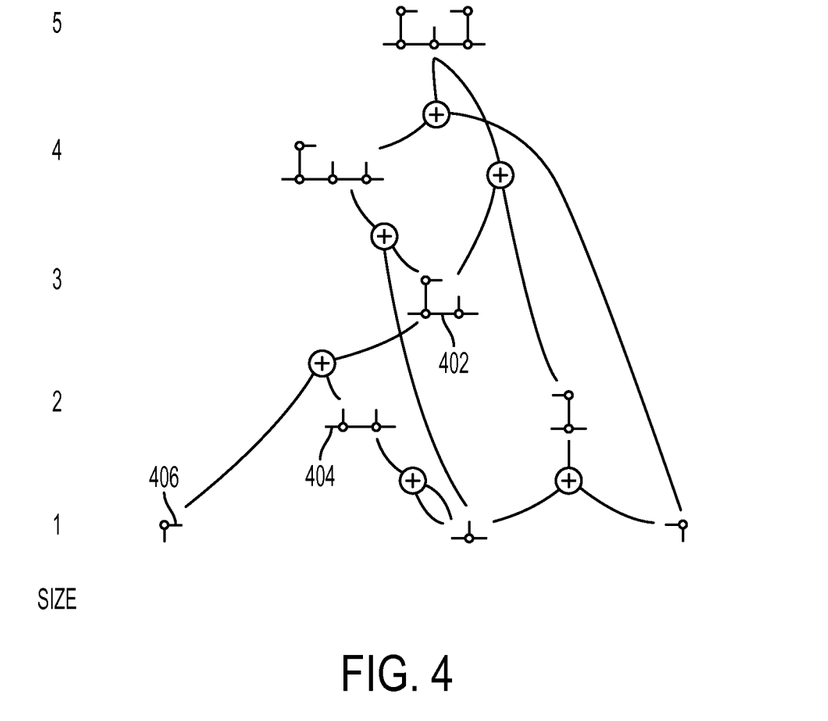
FIG. 4 illustrates parent-child relations that define a graph lattice.

Parent-child relations between subgraphs form a lattice. As a matter of terminology, smaller subgraphs are termed parent nodes and larger subgraphs generated from smaller subgraphs by adding primitives are termed child nodes. FIG. 4 illustrates this concept. Therein, with exception to the primitives, each subgraph of size i is comprised of a subgraph of size i−1 and a primitive. For example, subgraph 402 of size 3 is comprised of subgraph 404 of size 2 and primitive 406 (i.e., a subgraph of size 1). Notwithstanding that the discussion herein assumes that child graph lattice nodes are always one size larger than their parents, in certain embodiments two subgraphs of arbitrary size may be conjoined to create a larger subgraph.

To build a fully populated graph lattice of size N, all thirteen primitives are appended onto all link-compatible locations of subgraphs of size i to define all the subgraphs of size i+1, where i extends from 1 to N−1. As should be appreciated, each level of the lattice acts as the base for the next layer. Further, building an entire graph lattice of size N provides an abstract representation for the space of all possible figures containing N junctions and all subgraphs of each figure. However, fully populating a graph lattice grows astronomically above size 3, whereby it is not practical to build a fully populated graph lattice above size 5 for many applications.

Consider now a graph lattice representing only a single figure and all of its subgraphs, where the figure contains N junctions. This figure will define a single node in the graph lattice at size N. Then at size N−1 the figure will have N−1 nodes, each of which is a subgraph with one of its junctions missing. The number of nodes at size N−2 will depend on the figure's topology. Thus, the graph lattice forms a diamond shape with a flattened base, where the base is comprised of thirteen nodes representing the primitives. The diamond will typically be widest at layers around $$\frac{N}{2},$$

where most combinations of present and missing junctions tend to occur. Thus, the total number of nodes in the complete graph lattice for a single figure is on the order of $2^N$.

Notwithstanding that the concept of a graph lattice was introduced in the context of rectilinear line art, it is to be appreciated that other formulations are equally amenable. Namely, it is to be understood that the concepts of graph lattice are more broadly applicable to any subject matter capable of representation by a set of primitives.

2.0 BUILDING A GRAPH LATTICE

After introducing some basic concepts involved with the generation of a graph lattice, an algorithm for building a graph lattice is introduced. Briefly, the algorithm manages the complexity of a graph lattice by only building the portion of the entire theoretical graph lattice that is meaningful and useful for a given data corpus. A data corpus is a collection of data graphs, where each data graph corresponds to an image, such as an image of a form. A data graph represents an image using primitives, discussed above, where nodes in the data graph correspond to primitives and edges in the data graph correspond to links between the primitives. In the case of rectilinear line art, a data graph of an image is constructed by extracting the rule lines to determine the junctions formed by the rule lines. These junctions then define nodes of the data graph, which are interconnected according to the rule lines.

Figure 5:
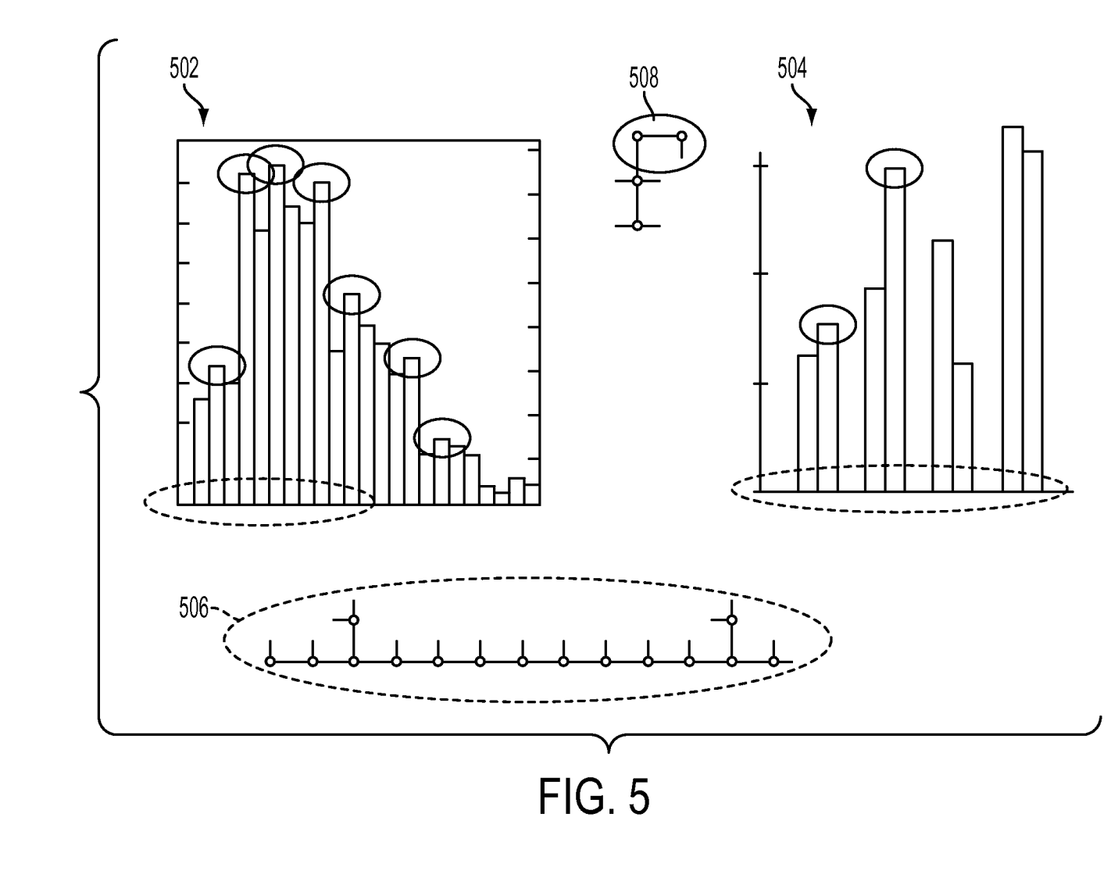
FIG. 5 illustrates two images that can be used to build a graph lattice.

FIG. 5 is illustrative in explaining how to build a graph lattice for the data graphs of two images 502, 504. Suppose the data graph of each image is comprised of N junctions. As noted above, if N>5, it is generally impractical to build a fully populated graph lattice. Thus, to address this problem, the graph lattice is only populated with subgraphs found in the data graphs of the two images 502, 504, such as subgraphs 506, 508.

2.1 Struts

A graph lattice node at a lower level (i.e., size) may be a subgraph of a graph lattice node at a higher level. Parent-child relations are typically maintained in triples. A triple consists of a node at level N (i.e., the parent), a primitive and technically a second parent, and a node at level N+1. The node at level N+1 is the subgraph consisting of the subgraph of the parent graph lattice node and the primitive linked to the perimeter (i.e., the child) of the subgraph of the parent graph lattice node.

Triples are typically maintained in a data structure called a strut. A strut maintains the junction index mapping between a parent and child graph lattice node. In general, any graph lattice node will index its component junctions in arbitrary order, and a strut keeps those organized between parent and child graph lattice nodes. Further, a strut indicates the primitive type, placement on the parent, and links for the junction that constructs the child from the parent.

Figure 6:
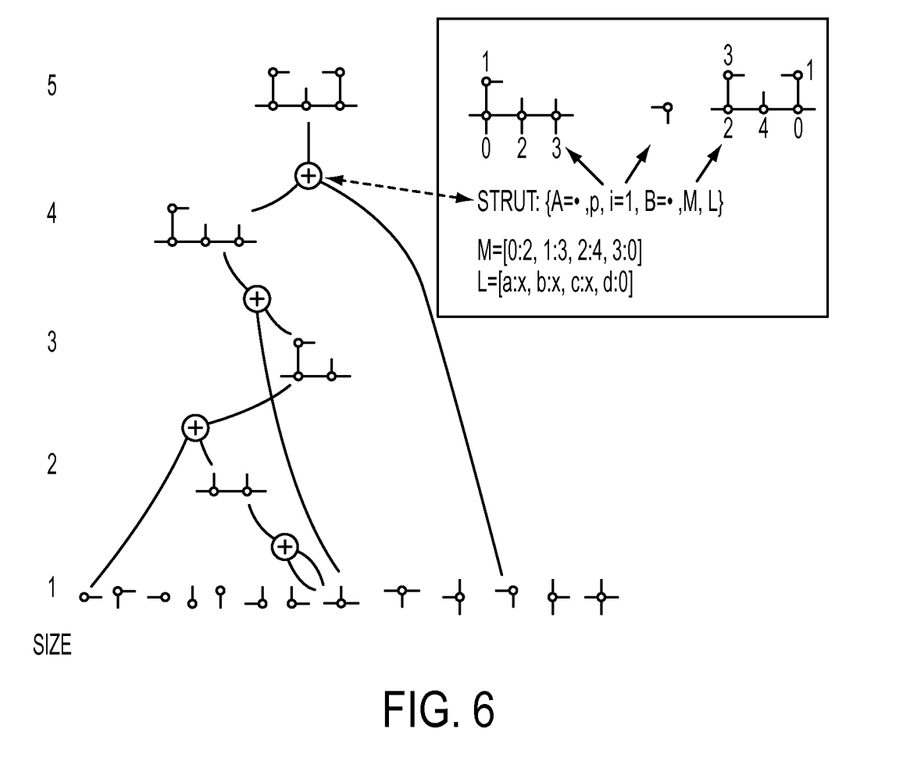
FIG. 6 illustrates the concept of a strut.

Referring to FIG. 6, the concept of a strut is illustrated. A strut maintains pointers to its constituent graph lattice nodes. A strut is denoted as S {A, p, i, B, M, L}, where A is the parent graph lattice node; p is the type of the primitive added to the parent to create the child; i is the index of this primitive in the child subgraph; B is the child subgraph (i.e., graph lattice node); M is the mapping between parent junction indices and child junction indices; and L is the linkage of the primitive into the parent to create the child subgraph. L maps from direction indices on the added primitive to node indices of the child.

Graph lattice nodes typically maintain lists of struts they participate in. However, in certain embodiments, the primitives do not maintain these lists unless both parents are primitives and the child is a size 2 graph lattice node. Advantageously, this promotes economy.

2.2 Mappings

Figure 7:
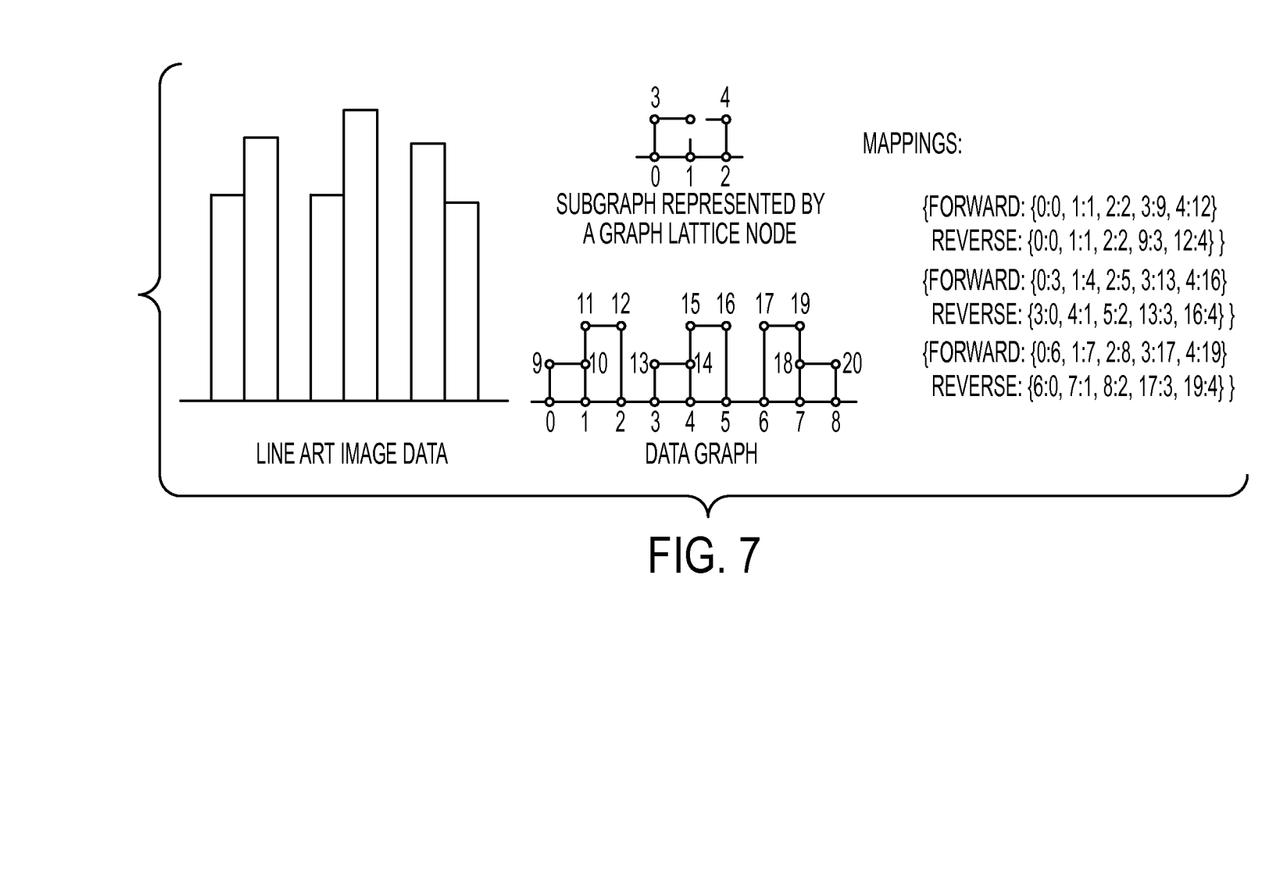
FIG. 7 illustrates mappings between an example data graph and a subgraph of a graph lattice node.

Each graph lattice node is itself a subgraph. As such, a node can be matched to an observed data graph by mapping the graph lattice node's subgraph junctions to corresponding data graph junctions. Because the primitives are typed, any well-known algorithm for attributed subgraph matching can perform this matching. FIG. 7 illustrates the resulting mappings between an example data graph and a graph lattice node's subgraph. In general such a mapping will be one-to-many (i.e., a single subgraph represented by a graph lattice node may map to multiple portions of an observed data graph).

To facilitate efficient construction of a graph lattice, mappings between graphic lattice nodes and observed data graphs can be maintained using a data structured called a Mapping-Set. In that regard, each graph lattice node includes a MappingSet for each data graph its subgraph maps to. The MappingSet(s) of a graph lattice node record the identities and locations on data graph(s) the graph lattice node's subgraph maps to.

A MappingSet consists of a triple: {graph lattice node, DataGraphID, list-of-Mappings}. A DataGraphID is a pointer to a data graph and its associated original image (e.g., a filename). A list-of-Mappings is a list of mappings, each of which is a pair: {forward-mapping-array, reverse-mapping-array}. A forward-mapping-array is an array having a size equal to the size of the graph lattice node. This array maps from node indices of the graph lattice node's subgraph onto indices of nodes in the data graph. A reverse-mapping-array is an array or hashtable that maps from node indices of the data graph to node indices of the subgraph represented at the graph lattice node. As the data graph will be very large, it is more space-efficient to store the reverse-mapping as a hashtable (with collision detection) instead of as an array having a length equal to the size of the data graph.

2.3 Accepted and Candidate Nodes

At any given time a list of Accepted graph lattice nodes and a list of Candidate graph lattice nodes are maintained. The purpose of these lists is described in more detail below, but, briefly, Accepted graph lattice nodes are nodes that have been added to the graph lattice and Candidate graph lattice nodes are nodes being considered for addition to the graph lattice. As a starting condition, a list of primitives is used for the Accepted graph lattice nodes and an empty set is used for the initial Candidate graph lattice nodes.

Further, the sets of Candidate and Accepted graph lattice nodes are each maintained in a data structure consisting of an array indexed by size (number of primitives). Each element of this array consists of a hashtable indexed by the combinations of numbers of primitives. For example, a hash index may be computed using the Java hashing function on a string concatenated from digits counting the number of matches of each primitive to a data graph. The purpose of this data structure is to make it efficient to detect duplicate graph lattice nodes.

In certain embodiments, each Accepted and Candidate graph lattice node maintains a count of the number of primitives it is built from so as to more efficiently facilitate indexing by size. As should be appreciated, the count of a graph lattice node's primitives corresponds to the size, or level, of the graph lattice node.

2.4 Algorithm

Figure 8:
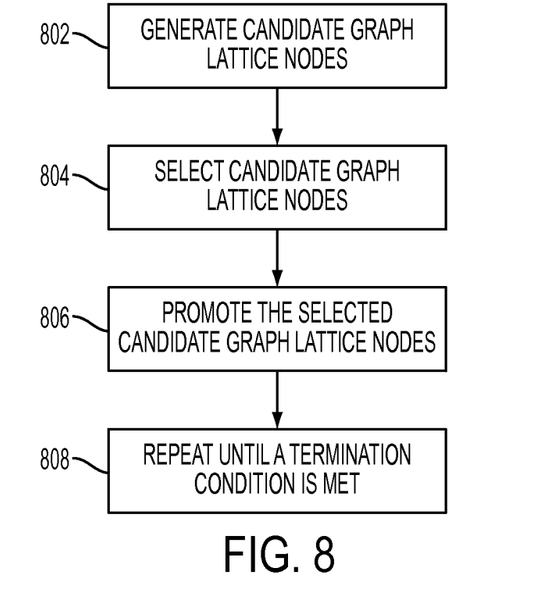
FIG. 8 illustrates an algorithm for generating a graph lattice.

A basic algorithm for generating a graph lattice is shown in FIG. 8. The algorithm takes as input a set of data exemplars, each of which is a data graph consisting of nodes representing primitive elements and links representing relations among primitive elements. These exemplars allow the graph lattice to be narrowly tailored for the use at hand by only generating subgraphs that can be mapped to the data exemplars. The algorithm includes generating Candidate graph lattice nodes (Action 802), selecting Candidate graph lattice nodes (Action 804), promoting the selected graph lattice nodes (Action 806), and repeating until a termination condition is met (Action 808).

To begin, Candidate graph lattice nodes are generated from Accepted graph lattice nodes and observed data graphs (Action 802). In the way of overview, mappings of Accepted graph lattice nodes onto observed data graphs are examined and used to spawn new Candidate graph lattice nodes. Observed data graphs may include previously seen data graphs and/or new, novel, previously unobserved data graphs. As noted above, the Accepted graph lattice nodes are initially comprised of a list of primitives.

The first step in generating Candidate graph lattice nodes is to generate extensions of Accepted graph lattice nodes of size N. Every mapping of a Level N graph lattice node onto an observed data graph can serve as a seed for spawning new Level N+1 graph lattice nodes, which are supergraphs of the subgraph represented by that graph lattice node. Each primitive linked to the perimeter of the subgraph can itself give rise to a subgraph one node larger in size, and therefore one size (i.e., level) higher in a graph lattice. This is hereafter referred to as an extension of a graph lattice node.

Figure 9:
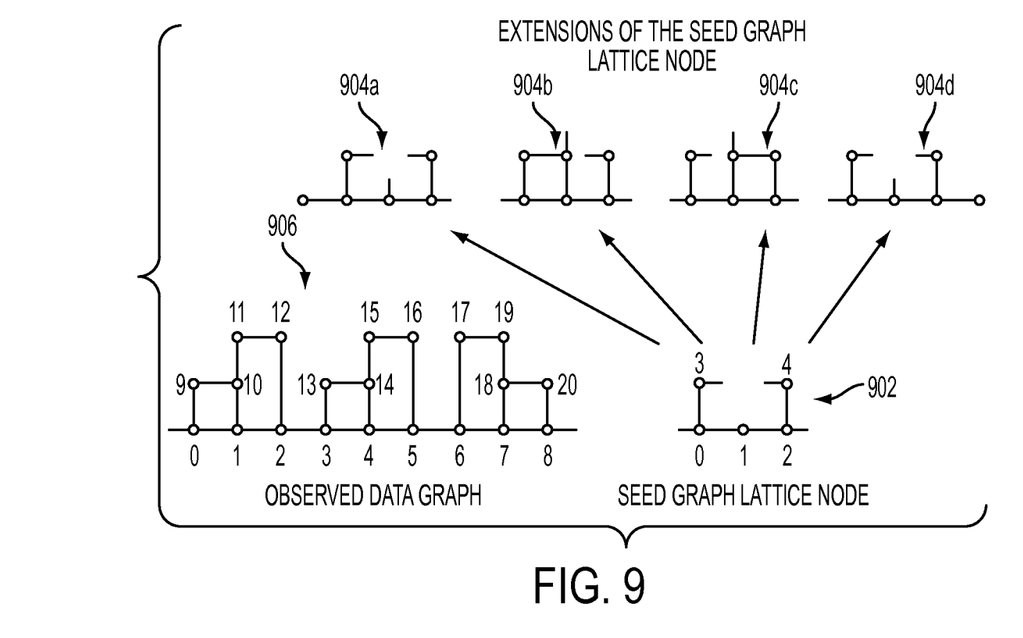
FIG. 9 illustrates the concept of an extension.

Referring to FIG. 9, this concept is illustrated. Therein, a seed graph lattice node 902 is used to spawn four extensions 904a-904d. For this example, it is to be understood, each extension is of size 6, which is one size higher than the seed graph lattice node. Further, each extension is found within an observed data graph 906.

Before being added as a new level N+1 Candidate graph lattice node, each extension generated by every level N Accepted graph lattice node is compared with the existing graph lattice at level N+1 to make sure it does not duplicate an existing Accepted or Candidate graph lattice node. This duplication check is facilitated by the hashtable indexing of graph lattice nodes described above. Through the hashtable, the set of possibly identical level N+1 graph lattice nodes that have to be compared by actual graph matching is narrowed down to only a small number of Candidate graph lattice nodes.

If an extension isn't found, it is added to the list and hashtable of Candidate graph lattice nodes at level N+1. Each new Candidate graph lattice node is then also linked into the data graph(s) it maps to through struts. The strut linking this new Candidate graph lattice node with its level N parent and associated primitive is obvious. But because of the lattice nature of the graph lattice, other level N graph lattice nodes may also be subgraphs of the new extension. Struts for these relations must be formed as well.

Referring back to FIG. 8, once the Candidate graph lattice nodes are generated (Action 802), some of the Candidate graph lattice nodes are selected for promotion to Accepted graph lattice nodes (Action 804). In general the goal is to grow the graph lattice so that the nodes added serve the purpose of classification.

One method for selecting Candidate graph lattice nodes is a maximum node type diversity criterion. This method rank orders all Candidate graph lattice nodes by diversity of primitive types, measured as the entropy $H_n$ of primitive node types i in graph lattice node n, $$H_n = \sum_i -p_i \log p_i \quad (1)$$

$$p_i = \frac{c_i}{\sum_i c_i} \quad (2)$$

where $c_i$ is the count of the number of primitives of type i used in graph lattice node n. The node type diversity criterion leads to growing graph lattices that include nodes that contain many different types of junctions, which are often the most diagnostic subgraphs of a data graph for purposes of classification. Other selection criteria are also possible.

Candidate graph lattice nodes previously selected (Action 804) are next promoted to Accepted graph lattice nodes (Action 806). By virtue of attaining Accepted status, a graph lattice node is eligible to serve as a seed for new Candidate graph lattice nodes.

After the Candidate graph lattice nodes are promoted (Action 806), the algorithm repeats until a termination condition is met (Action 808). Repetition is trivial since a newly promoted graph lattice node of size N already refers to mappings to observed data graphs. These mappings are then easily followed to search for children of the promoted graph lattice node that represent subgraphs observed in the data samples that are not already represented by graph lattice nodes at level N+1.

Possible termination conditions include one or more of:
(i) the graph lattice containing a threshold number of Accepted graph lattice nodes at a given level;
(ii) the graph lattice containing a threshold number of Accepted graph lattice nodes in total;
(iii) the list of Candidate graph lattice nodes being exhausted;
(iv) quality measures for Candidate graph lattice nodes fall below a threshold; and,
(v) the runtime exceeding a predetermined period of time.

In certain embodiments, the termination condition is dependent on the acceptance strategy discussed in Action 804.

3.0 MATCHES TO AN OBSERVED DATA GRAPH

Because a graph lattice can be very large (containing thousands or hundreds of thousands of nodes), it is important to compute the mappings of graph lattice nodes to observed data graphs efficiently. A naive approach is to perform subgraph matching independently between an observed data graph and each graph lattice node's subgraph. However, a more efficient algorithm that exploits the lattice structure in the relations among graph lattice nodes is discussed hereafter.

Figure 10:
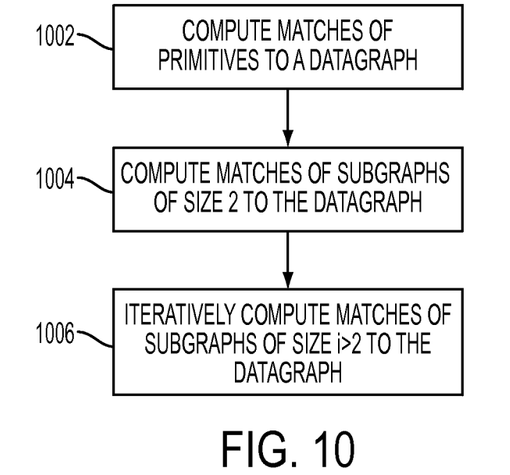
FIG. 10 illustrates an algorithm for computing mappings.

With reference to FIG. 10, an algorithm for computing mappings is illustrated. The algorithm takes as input a data graph and outputs a compilation of MappingSets describing all mappings from subgraphs represented by graph lattice nodes onto the data graph. The algorithm includes computing matches of primitives to nodes of the data graph (Action 1002), computing matches of subgraphs of size 2 to the data graph (Action 1004), and iteratively computing matches of subgraphs of size 3 and higher (Action 1006).

To begin, the subgraphs of size 1 are matched to the data graph (Action 1002). A subgraph can be matched to an observed data graph by mapping the graph lattice node's subgraph junctions to corresponding data graph junctions.

After the subgraphs of size 1 are matched (Action 1002), the subgraphs of size 2 are mapped to the data graph (Action 1004). For each pair of primitives A and B, a determination is made as to whether the pair of primitives A and B are parents of one or more struts to level 2 graph lattice nodes $C_1$, $C_2$, ..., $C_N$. If so, the algorithm iterates over all the mappings of A onto the data graph and determines whether $C_i$ is a valid mapping. The determination as to whether $C_i$ is a valid mapping is performed by testing the data graph for the existence of a link to primitive B in the correct proximity to A for that mapping.

Having mapped the subgraphs of size 2 to the data graphs (Action 1004), mappings at levels 3 and greater are iteratively computed, starting at level 3 graph lattice nodes. For each graph lattice node B at level N (starting with N=3), the algorithm selects one strut S to a parent node A at the previous level. It is only necessary to consider one strut because in order for a mapping at level N to be found, all of the node's subgraphs at level N−1 will be mapped. For the level N−1 parent node A associated with the strut S, the algorithm then iterates over each of its mappings onto the data graph, and, for each such mapping, examines whether the primitive p indicated by the strut S is also present on the data graph and linked as indicated by the strut's linkage parameter L. If this primitive is present and appropriately linked then the mapping to B can be established.

The complexity of this procedure grows linearly with the number of parent-child struts in the graph lattice and linearly with the number of mappings between graph lattice nodes and the data graph. The important point is that at each level, only a small amount of work is needed to compute mappings because all mappings are incremental extensions to mappings found at the previous level.

Figure 11:
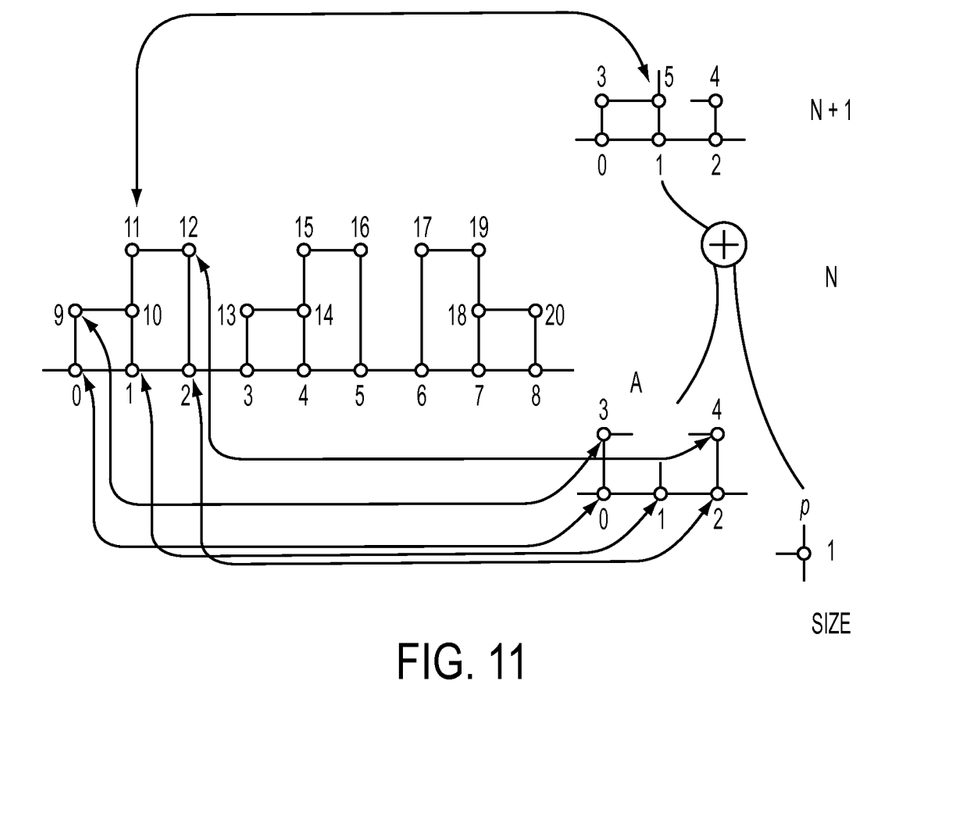
FIG. 11 illustrates a concept underlying the algorithm of FIG. 10.

Referring to FIG. 11, a concept underlying the matching algorithm is illustrated. Namely, the mapping of a graph lattice node B at level N+1 to a data graph is mostly inherited from the mapping of its parent graph lattice node A at level N to the data graph. The strut from A to B then indicates where on the data graph to test for the presence of the primitive p (index 5 on B). Thus, the matching algorithm undergoes an incremental mapping.

4.0 IMAGE CLASSIFICATION

Figure 12:
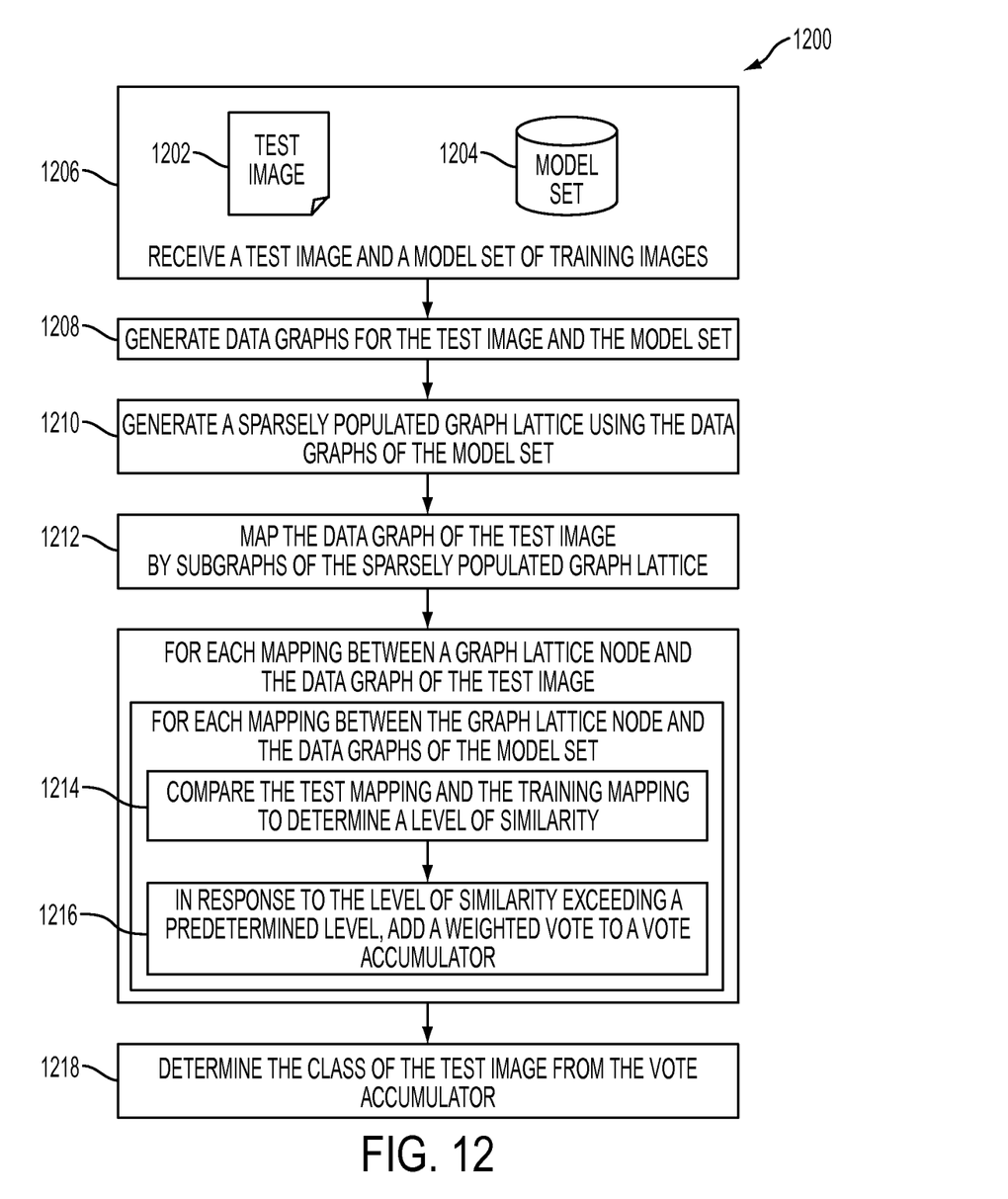
FIG. 12 illustrates an algorithm for classifying a test image.

An advantage of the graph lattice framework is that it allows efficient image classification. With reference to FIG. 12, an algorithm 1200 for classifying a test image 1202 is provided. For example, the test image 1202 can be an image of a United States tax form.

The algorithm 1200 includes receiving the test image 1202 and a model set 1204 of training images (Action 1206). The model set 1204 includes at least one training image exemplary of each of a plurality of classes, preferably including the class of the test image 1202. Data graphs are then generated for the test image 1202 and each of the training images (Action 1208). As discussed above, a data graph represents an image using primitives, where nodes in the data graph correspond to primitives and edges in the data graph correspond to links between the primitives.

Using the data graphs of the model set 1204, a sparsely populated graph lattice is generated (Action 1210), typically using the approach described in Section 2. This includes annotating each graph lattice node with its mapping(s) to the training data graphs and a weight. Typically, each mapping includes geometric information about the location and configuration of data graph junctions corresponding to the mapping. Such information can be captured using, for example, MappingSets, discussed above, or other data structures. Further, the weight of a graph lattice node is typically $$\frac{1}{N},$$

where N Is the number of subgraph(s) of the training data graphs the subgraph of the graph lattice node maps to. The weight can be easily determined since each subgraph includes mapping(s).

As should be appreciated, the sparsely populated graph lattice can be generated before classifying the test image 1202. Hence, in some embodiments, the algorithm 1200 receives the sparsely populated graph, as opposed to generating it.

Thereafter, the test data graph is mapped by subgraphs of the graph lattice (Action 1212), typically as described in Section 3. That is to say, mapping(s) to the test data graph are determined for each subgraph of the graph lattice found within the test data graph.

For each mapping between a graph lattice node and the test data graph, the mapping is compared against each mapping between the graph lattice node and the training data graphs to determine a level of similarity (Action 1214). Insofar as the level of similarity exceeds a predetermined level, a weighted vote is added to a vote accumulator array for the training data graph (Action 1216). The vote accumulator array is indexed based on training data graph, and the weighted vote is weighted based on the weight assigned to the graph lattice node.

In some embodiments, the comparison includes a geometric comparison to determine if the corresponding junctions of the test data graph and the training data graph mapped to by the graph lattice node are sufficiently aligned. This can include, for each of the subgraphs to be compared together, determining a centroid and a vector of relations between the centroid and the junctions of the subgraphs. Such relations can include, for example, the horizontal and/or vertical distances between the centroid and the junctions. The vectors can then be compared to determine a level of similarity. Insofar as the level of similarity exceeds a predetermined level, a weighted vote is added to a vote accumulator array for the training data graph.

Once all of the mappings between the graph lattice subgraphs and the test data graph are considered, the vote accumulator array holds the tally of weighted votes for all training data graphs. Using the vote accumulator array, the class of the training image 1202 is determined (Action 1218). The class of the training image 1202 is the class of the training data graph with the highest vote above a threshold number of votes, such as a predetermined number of votes. If no class receives a sufficient number of votes according to the threshold, then the class of the training image 1202 is unknown and the training image 1202 can be rejected.

Figure 13:
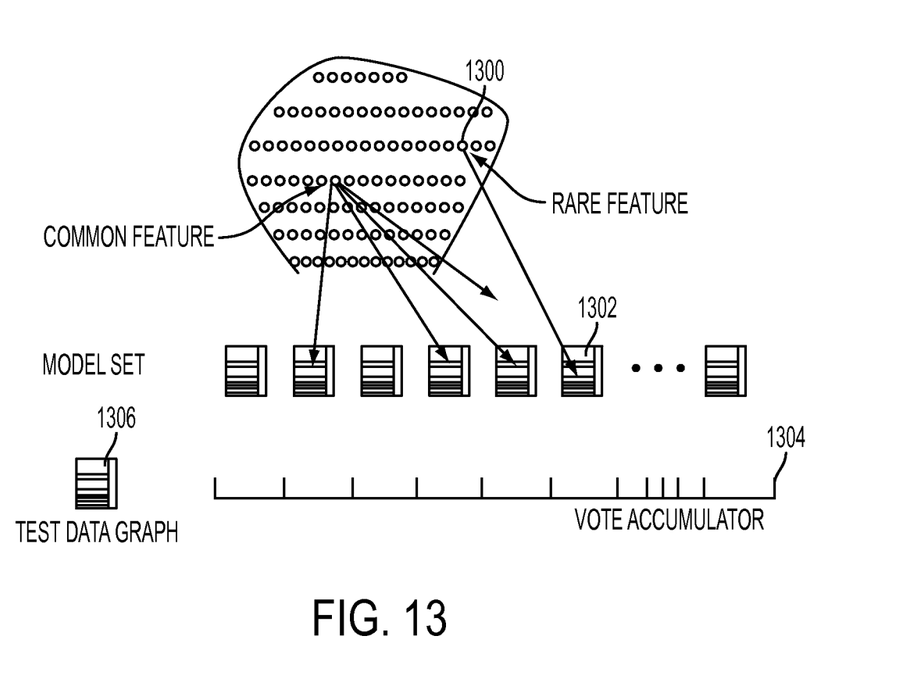
FIG. 13 illustrates a concept underlying the algorithm of FIG. 12.

Referring to FIG. 13, this approach to image classification is graphically illustrated. Therein, each node of a graph lattice, such as node 1300, is treated as a feature. Rare features, which only map to a small number of training data graphs, such as training data graph 1302, are weighted more heavily than common features, which map to a large number of training data graphs, since they are more discriminative and better for classification. Weighted votes are accumulated in a vote accumulator array 1304 by comparing mappings of the training data graphs with mappings of a test data graph 1306.

5.0 SYSTEM IMPLEMENTATION

Figure 14:
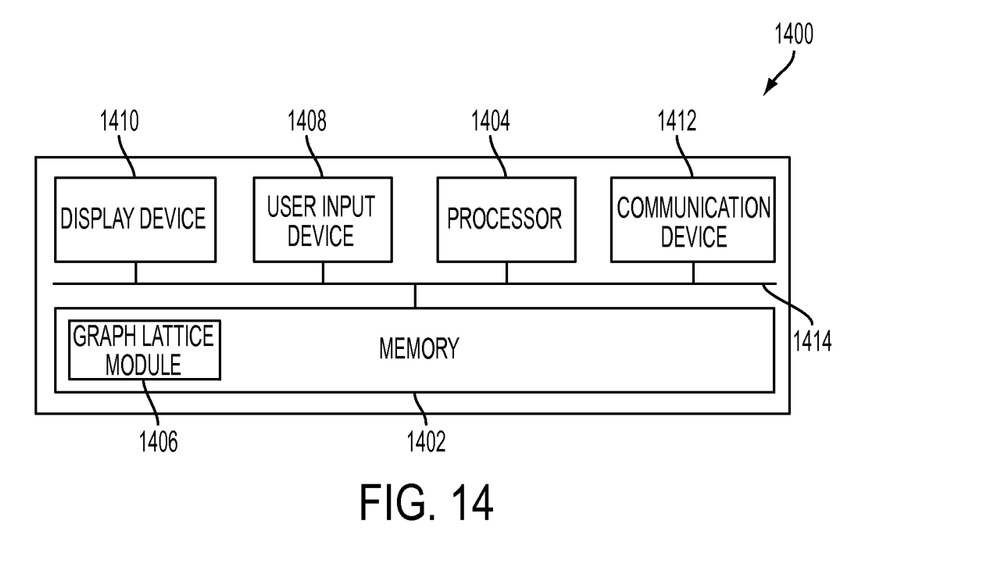
FIG. 14 illustrates a graph lattice system.

With reference to FIG. 14, a graph lattice system 1400 includes at least one memory 1402 and at least one processor 1404. The memory 1402 includes a graph lattice module 1406 comprised of processor executable instructions that implement the algorithm 1200 of FIG. 12 to classify one or more test images. During use of the system 1400, the processor 1404 executes the processor executable instructions of the graph lattice module 1406 to classify the test images using the algorithm 1200 of FIG. 12. In this way, the processor 1404 is programmed to perform the algorithm 1200 of FIG. 12.

The system 1400 can further include, or be operatively connected with, one or more user input devices 1408 for receiving user input to control the system 1400. Further, the system 1400 can further include, or be operatively connected with, one or more display devices 1410 for displaying output generated by the system 1400. An optional communication device 1412 allows the system 1400 to communicate with other systems, for example, over a communications network, such as the Internet, a local area network, a wide area network, and the like. At least one system bus 1414 of the system 1400 interconnects components thereof, such as the memory 1402 and the processor 1404.

Figure 15:
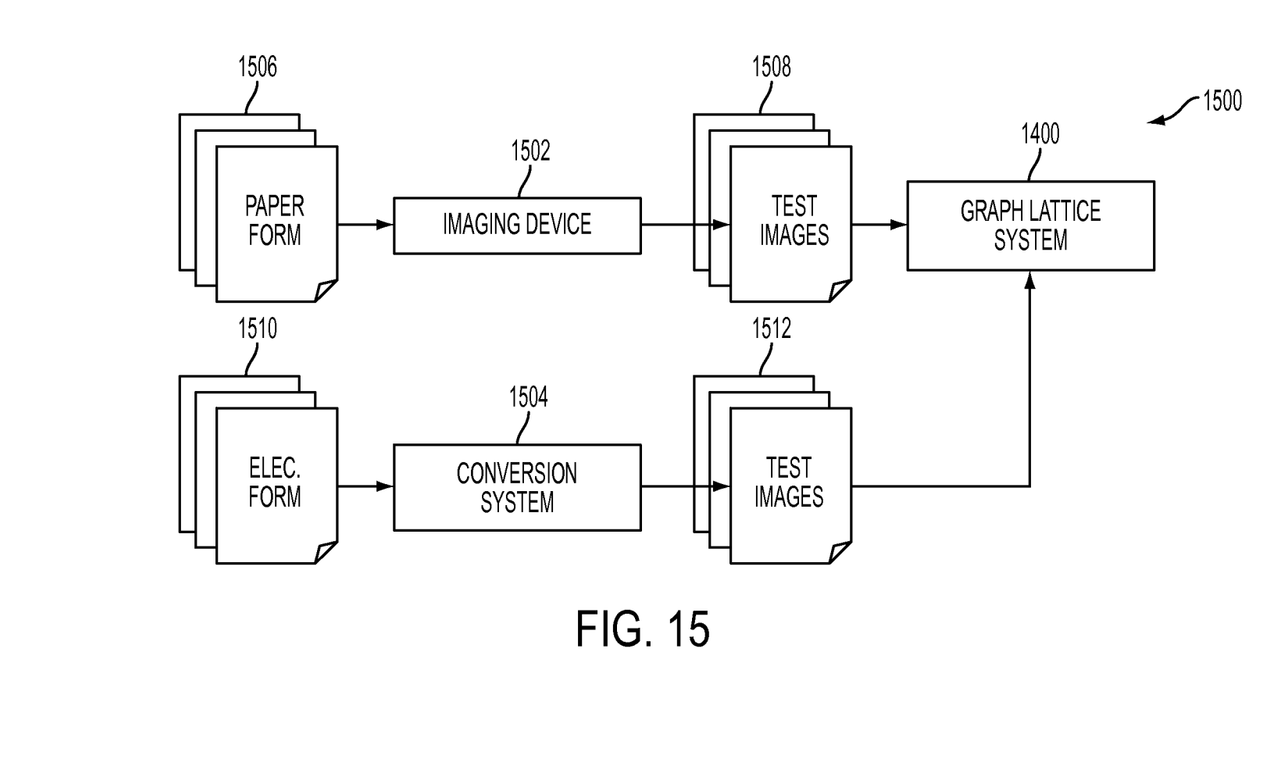
FIG. 15 illustrates a document vision system employing the graph lattice system of FIG. 14.

With reference to FIG. 15, a computer vision system 1500 using the graph lattice system 1400 of FIG. 14 is illustrated. The computer vision system 1500 may include an imaging device 1502 and/or a conversion system 1504, and the graph lattice system 1400 of FIG. 14. Notably, the computer vision system 1500 may only include one of the imaging device 1502 and the conversion system 1504.

The imaging device 1502 converts one or more paper forms 1506 into test images 1508. The imaging device 1502 may be one or more of a camera, a scanner, and the like. In certain embodiments, the imaging device 1502 may receive the paper forms 1506 via a conveyor path extending from a feed tray. However, other means of receiving the paper forms 1506 are equally amenable. For example, in certain embodiments, an operator of the computer vision system 1500 may feed the paper forms 1506 to the imaging device 1502. The conversion system 1504 converts one or more electronic forms 1510 into test images 1512. Electronic forms 1510 can be formatted in PDF, XML, Word, and the like. The electronic forms 1510 may be loaded from a magnetic or optical media or a network.

The graph lattice system 1400 processes the test images 1508, 1512 to classify the test images according to the algorithm 1200 of FIG. 12. Suitably, the graph lattice system 1400 receives the test images 1508, 1512 via a communications network, such as the Internet, a local area network, a wireless network, and the like. However, in other embodiments, the graph lattice system 1400 may receive the test images 1508, 1512 via a data bus, such as USB, Firewire, etc., a storage medium, such as a CD, a thumb drive, etc., and the like.

Once a test image is classified, the corresponding forms are processed as necessary. For example, paper forms may be routed via conveyer path(s) to a destination based upon their classification. Alternatively, or in addition, the electronic forms may be stored in a database and/or stored within a file system according to their classification.

6.0 CONCLUSION

Graph lattices and the algorithm applying the same facilitate efficiency, accuracy, and scalability in image classification. Efficiency derives from the algorithms for computing mappings to subgraphs that build from simple patterns to more complex patterns in a graph lattice. Accuracy derives from the redundancy in the graph lattice by the storage of a very large set of subgraphs in the graph lattice. Scalability derives from the algorithm disclosed to grow large graph lattices (that are still much smaller than the space of all subgraphs) that are tailored to observed data.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a digital processing unit, a graphic processing unit (GPU), an application-specific integrated circuit (ASIC), an FPGA, and the like; a user input device includes one or more of a mouse, a keyboard, a touch screen display, one or more buttons, one or more switches, one or more toggles, and the like; a database includes one or more memories; and a display device includes one or more of a LCD display, an LED display, a plasma display, a projection display, a touch screen display, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for classifying a test image, said system comprising:
at least one processor programmed to:
receive a data graph of the test image;
receive a graph lattice, the graph lattice including a plurality of nodes, each of the plurality of nodes including a subgraph, a weight and at least one mapping of the subgraph to data graphs of a plurality of training images, the plurality of training images corresponding to a plurality of classes;
map the data graph of the test image by the subgraphs of the plurality of nodes;
compare mappings between the graph lattice and the data graphs of the training images with mappings between the graph lattice and the data graph of the test image to determine, for each of the training images, a weighted vote of similarity between the data graph of the training image and the data graph of the test image, the weighted vote based on the weights of the plurality of nodes; and,
determine a class of the test image from the weighted votes of the training images, the class of the test image being the class of the training image with the highest weighted vote above a threshold number of votes.

2. The system according to claim 1, wherein the data graph of the test image and the data graphs of the plurality of training images represent the corresponding images using primitives, the primitives corresponding to data graph nodes.

3. The system according to claim 2, wherein the primitives include junction types of rectilinear line art.

4. The system according to claim 1, wherein the graph lattice is a sparsely populated graph lattice generated from the training images.

5. The system according to claim 1, wherein nodes of size 1 of the graph lattice correspond to one of a plurality of primitives and nodes of size i>1 of the graph lattice each include a subgraph comprised of a subgraph of a node of size i−1 and one of the plurality of primitives.

6. The system according to claim 1, wherein the comparison includes:
for each mapping between a node of the graph lattice and the data graph of the test image:
for each mapping between the node of the graph lattice and the data graphs of the training images:
comparing the mapping of the test image with the mapping of the training image to determine a level of similarity; and,
in response to the level of similarity exceeding a predetermined level, add a weighted vote for the training image corresponding to the mapping of the training images to a vote accumulator;
wherein the class of the test image is determined using the vote accumulator.

7. The system according to claim 6, wherein the comparing the mapping of the test image with the mapping of the training images includes:
comparing a geometric arrangement of a subgraph of the test image corresponding to the mapping of the test image with a subgraph of the training images corresponding to the mapping of the training images.

8. The system according to claim 1, wherein the weighted votes of similarity of the training images are based on geometric similarity between subgraphs of the test image and subgraphs of the training images.

9. The system according to claim 1, wherein the weight decreases as the number of times the subgraph maps to the data graphs of the training images increases.

10. The system according to claim 1, wherein the mapping includes mapping the subgraphs of the plurality of nodes to the data graph of the test image.

11. A method for classifying a test image, said method comprising:
- receiving by at least one processor a data graph of the test image;
- receiving by the at least one processor a graph lattice, the graph lattice including a plurality of nodes, each of the plurality of nodes including a subgraph, a weight and at least one mapping of the subgraph to data graphs of a plurality of training images, the plurality of training images corresponding to a plurality of classes;
- mapping by the at least one processor the data graph of the test image by the subgraphs of the plurality of nodes;
- comparing by the at least one processor mappings between the graph lattice and the data graphs of the training images with mappings between the graph lattice and the data graph of the test image to determine, for each of the training images, a weighted vote of similarity between the data graph of the training image and the data graph of the test image, the weighted vote based on the weights of the plurality of nodes; and,
- determining by the at least one processor a class of the test image from the weighted votes of the training images, the class of the test image being the class of the training image with the highest weighted vote above a threshold number of votes.

12. The method according to claim 11, wherein the data graph of the test image and the data graphs of the plurality of training images represent the corresponding images using primitives, the primitives corresponding to data graph nodes.

13. The method according to claim 12, wherein the primitives include junction types of rectilinear line art.

14. The method according to claim 11, wherein the graph lattice is a sparsely populated graph lattice generated from the training images.

15. The method according to claim 11, wherein nodes of size 1 of the graph lattice correspond to one of a plurality of primitives and nodes of size i>1 of the graph lattice each include a subgraph comprised of a subgraph of a node of size i−1 and one of the plurality of primitives.

16. The method according to claim 11, wherein the comparison includes:
- for each mapping between a node of the graph lattice and the data graph of the test image:
  - for each mapping between the node of the graph lattice and the data graphs of the training images:
    - comparing the mapping of the test image with the mapping of the training images to determine a level of similarity; and,
    - in response to the level of similarity exceeding a predetermined level, add a weighted vote for the training image corresponding to the mapping of the training images to a vote accumulator;
- wherein the class of the test image is determined using the vote accumulator.

17. The method according to claim 16, wherein the comparing the mapping of the test image with the mapping of the training images includes:
- comparing a geometric arrangement of a subgraph of the test image corresponding to the mapping of the test image with a subgraph of the training images corresponding to the mapping of the training images.

18. The method according to claim 11, wherein the weighted votes of similarity of the training images are based on geometric similarity between subgraphs of the test image and subgraphs of the training images.

19. The method according to claim 11, wherein the weight decreases as the number of times the subgraph maps to the data graphs of the training images increases.

20. A system for classifying a test image, said system comprising:
- at least one processor programmed to:
  - receive a data graph of the test image;
  - receive a graph lattice, the graph lattice including a plurality of nodes, each of the plurality of nodes including a subgraph, a weight and at least one mapping of the subgraph to data graphs of a plurality of training images, the plurality of training images corresponding to a plurality of classes;
  - map the subgraphs of the plurality of nodes to the data graph of the test image;
  - for each mapping between a node of the graph lattice and the data graph of the test image, compare the mapping of the test image with each mapping between the node of the graph lattice and the data graphs of the training images;
  - based on the comparisons, determine, for each of the training images, a weighted vote of similarity between the data graph of the training image and the data graph of the test image, the weighted vote based on the weights of the plurality of nodes; and,
  - determine the class of the test image from the weighted votes of the training images, the class of the test image being the class of the training image with the highest weighted vote above a threshold number of votes.

* * * * *